(12) United States Patent
Schneider et al.

(10) Patent No.: US 7,975,266 B2
(45) Date of Patent: Jul. 5, 2011

(54) REMOTE INSTALLATION OF COMPUTER RESOURCES

(75) Inventors: Manfred Schneider, Nussloch (DE); Erol Bozak, Pforzheim (DE)

(73) Assignee: SAP Aktiengesellschaft, Walldorf (DE)

( * ) Notice: Subject to any disclaimer, the term of this patent is extended or adjusted under 35 U.S.C. 154(b) by 1446 days.

(21) Appl. No.: 10/903,890

(22) Filed: Jul. 30, 2004

(65) Prior Publication Data

US 2006/0026589 A1 Feb. 2, 2006

(51) Int. Cl.
*G06F 9/445* (2006.01)
*G06F 9/44* (2006.01)
*G06F 15/177* (2006.01)

(52) U.S. Cl. ........ 717/178; 717/168; 709/220; 709/222; 713/2

(58) Field of Classification Search .......... 717/168–178, 717/127
See application file for complete search history.

(56) References Cited

U.S. PATENT DOCUMENTS

| | | | | |
|---|---|---|---|---|
| 5,666,501 A | * | 9/1997 | Jones et al. | 717/177 |
| 5,805,897 A | * | 9/1998 | Glowny | 717/178 |
| 5,870,611 A | * | 2/1999 | London Shrader et al. | 717/175 |
| 6,061,796 A | * | 5/2000 | Chen et al. | 726/15 |
| 6,075,943 A | * | 6/2000 | Feinman | 717/175 |
| 6,282,711 B1 | * | 8/2001 | Halpern et al. | 717/175 |
| 6,725,453 B1 | | 4/2004 | Lucas et al. | 717/178 |
| 6,748,380 B2 | * | 6/2004 | Poole et al. | 717/174 |
| 6,751,795 B1 | * | 6/2004 | Nakamura | 717/174 |
| 6,754,896 B2 | | 6/2004 | Mishra et al. | 717/176 |
| 6,772,192 B1 | | 8/2004 | Fulton et al. | 709/203 |
| 6,775,830 B1 | * | 8/2004 | Matsunami et al. | 717/176 |
| 6,789,215 B1 | | 9/2004 | Rupp et al. | 714/38 |
| 6,804,663 B1 | * | 10/2004 | Delo | 707/3 |
| 7,103,874 B2 | * | 9/2006 | McCollum et al. | 717/121 |
| 7,181,731 B2 | * | 2/2007 | Pace et al. | 717/177 |
| 2002/0156894 A1 | * | 10/2002 | Suorsa et al. | 709/226 |
| 2004/0006586 A1 | * | 1/2004 | Melchione et al. | 709/201 |
| 2005/0044530 A1 | * | 2/2005 | Novik | 717/170 |

* cited by examiner

*Primary Examiner* — Wei Zhen
*Assistant Examiner* — Ryan D Coyer
(74) *Attorney, Agent, or Firm* — Fish & Richardson P.C.

(57) ABSTRACT

Methods and apparatus, including computer program products, for installing resources in a computer system operate to identify a need to install resources on a target device and perform an installation of the resources on the target device using installer components located remotely from the target device. The remotely located installer components control the installation of the resources.

20 Claims, 6 Drawing Sheets

REMOTE INSTALLATION OF COMPUTER RESOURCES

BACKGROUND

The present invention relates to data processing by digital computer, and more particularly to remote installation of computer resources.

Desktop computers, mainframes, servers, and other types of general-purpose computers, and some types of special purpose computers, generally rely upon some type of installed software to be able to provide a variety of functions to users. Typically, many different kinds of software supporting many different functions can be installed on such a computer. Software that can be installed may include operating systems, application programs, extensions, and other types of resources, which each may include one or more installable units or components. An installable unit may reside on an external medium, such as a CD; in a local memory, such as a hard drive, associated with the computer; in a local network, such as in a file system directory; or remotely, such as on a file share server, a hypertext transfer protocol (HTTP) server, or an file transfer protocol (FTP) server.

Regardless of the location of the installable unit, an installer located on the computing system onto which the installable unit is to be installed is used to retrieve and install the installable unit. In some cases, a remote administrator device may trigger the installer. An installer is a utility program that facilitates or eases the installation of another application. Installers typically allow the user to select desired configuration options for the application installation or to use default configuration settings, set up corresponding initialization files, and copy the application to a hard disk on the computing system. The installer knows exactly what components it needs for the installation, where the components are located, and how to retrieve the components. In some cases, an uninstaller may be included as part of the installer program or as a separate program to enable users to reverse or remove the different files that are modified or generated during the installation process.

SUMMARY OF THE INVENTION

The present invention provides methods and apparatus, including computer program products, that implement techniques for installing resources in a computer system.

In one general aspect, the techniques feature installing resources in a computer system by identifying a need to install resources on a target device and performing an installation of the resources on the target device using one or more installer components located remotely from the target device. The one or more remotely located installer components control the installation of the resources.

The invention can be implemented to include one or more of the following advantageous features. The installation is performed by retrieving an installable component from a storage located remotely from the target device and installing the retrieved installable component in an installed units repository associated with the target device. One or more installer components on the target device are used for providing support to the one or more installer components located remotely from the target device. The target device stores metadata relating to the target device and the one or more installer components located remotely from the target device have access, through the one or more installer components on the target device, to the metadata stored by the target device and to an installed units repository associated with the target device.

Metadata is stored in association with the one or more installer components, and the metadata defines features such as attributes of the one or more installer components, attributes of an environment of the one or more installer components, and/or attributes of an installable units repository. One or more security functions are performed before performing an installation. The security functions can involve authenticating the target device, authenticating a device associated with the installer components located remotely from the target device, verifying an authorization to perform the installation, and controlling access between the target device and the installer components located remotely from the target device. The installer components on the target device provide an interface between the target device and the installer components located remotely from the target device.

The installer components located remotely from the target device provide a single application program interface operable to communicate with installer components on target devices, and the installer components on different types of target devices include different installer components, which correspond to the target device type. The installer components are used to perform an installation on multiple target devices. A status of the installation is monitored from the installer components located remotely from the target device.

A status of an installation can be controlled and monitored to send instruction messages to and receive status messages from the target device. The instruction messages include commands for executing the installation and the status messages include data relating to attributes of the target device and/or status information relating to a progress of the installation. The remotely located installer components communicate with a slave installation component in the target device.

The invention can be implemented to realize one or more of the following advantages. Installation of components can be performed from a remote location relative to a repository on a target device that stores installed components. Metadata used during the installation process can be distributed among different devices. To limit the amount of installation resources on target devices, common elements of the metadata that are shared among different installation processes can be stored at a central installer, which can install components on multiple different target devices. Software companies (and other similar enterprises) can provide installation hosting in which software is installed on customer devices by running the installation process on a particular company's own machines, in some cases without delivering the installable units to customers. The installer itself can be installed on one or a small number of devices and used to install components on a large number of target devices. The target device can provide necessary installation resources and other information to the installer. If manual actions are performed during the installation (e.g., making selections of installation options), these actions can be performed locally at an installer device without remote access to the target device. The administration and monitoring of installation can be simplified by using one or a small number of installer devices to host the metadata and installers for use with many target devicesOne implementation of the invention provides all of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
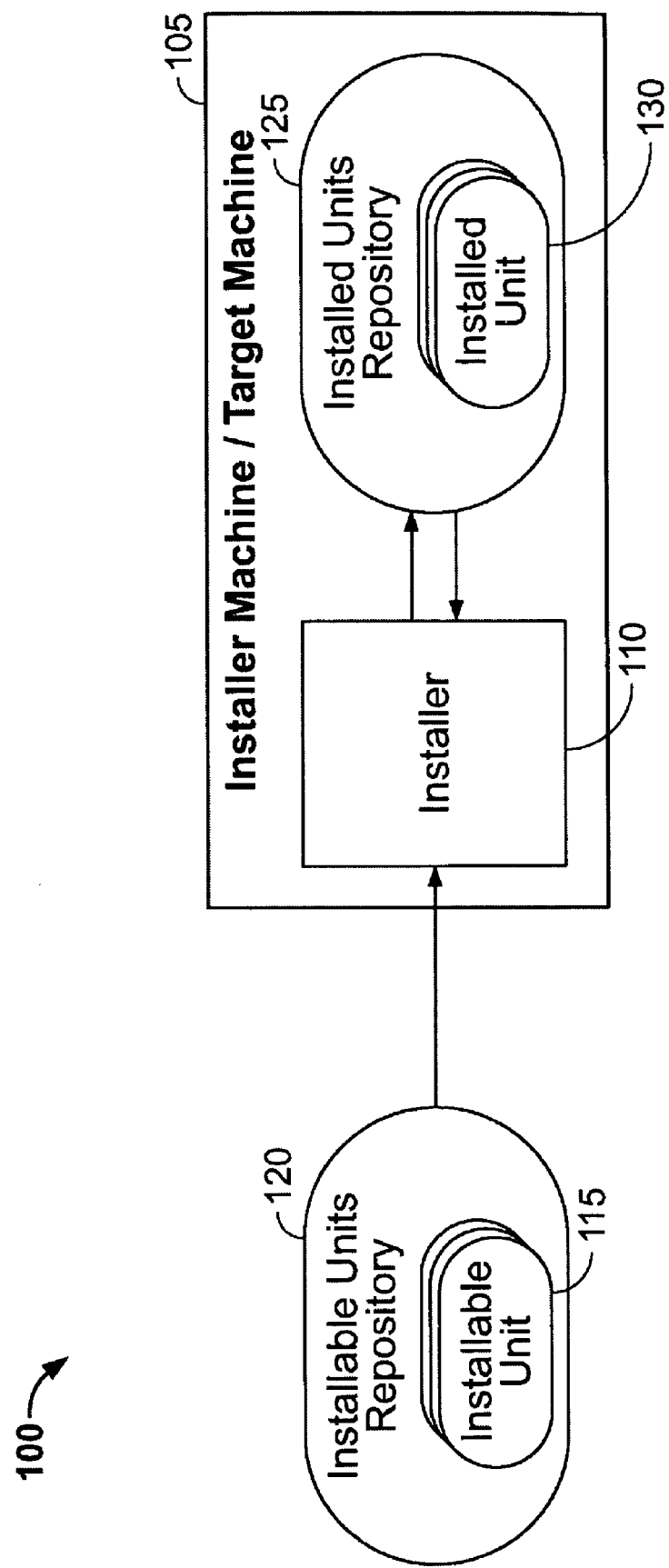
FIG. 1 is a block diagram of a conventional installation system that includes a target device, which further includes an installer.

As shown in FIG. 1, a conventional installation system 100 includes a target device 105 that further includes an installer 110. In general, the installer 110 is an executable utility program that runs on a processor (not shown) on the target device 105. The installer 110, once invoked, retrieves one or more installable components 115 from an installable units repository 120. The installable units repository 120 can reside locally (e.g., a local hard drive or a removable storage device, such as a CD) or remotely (e.g., in a server accessible over a network). The installer 110 installs the retrieved installable components 115 in an installed components repository 125, such as a hard drive of the target device 105. The installed components repository 125 stores one or more installed components 130, which are installed by the installer 110 or another installer located on the target device 105.

Figure 2:
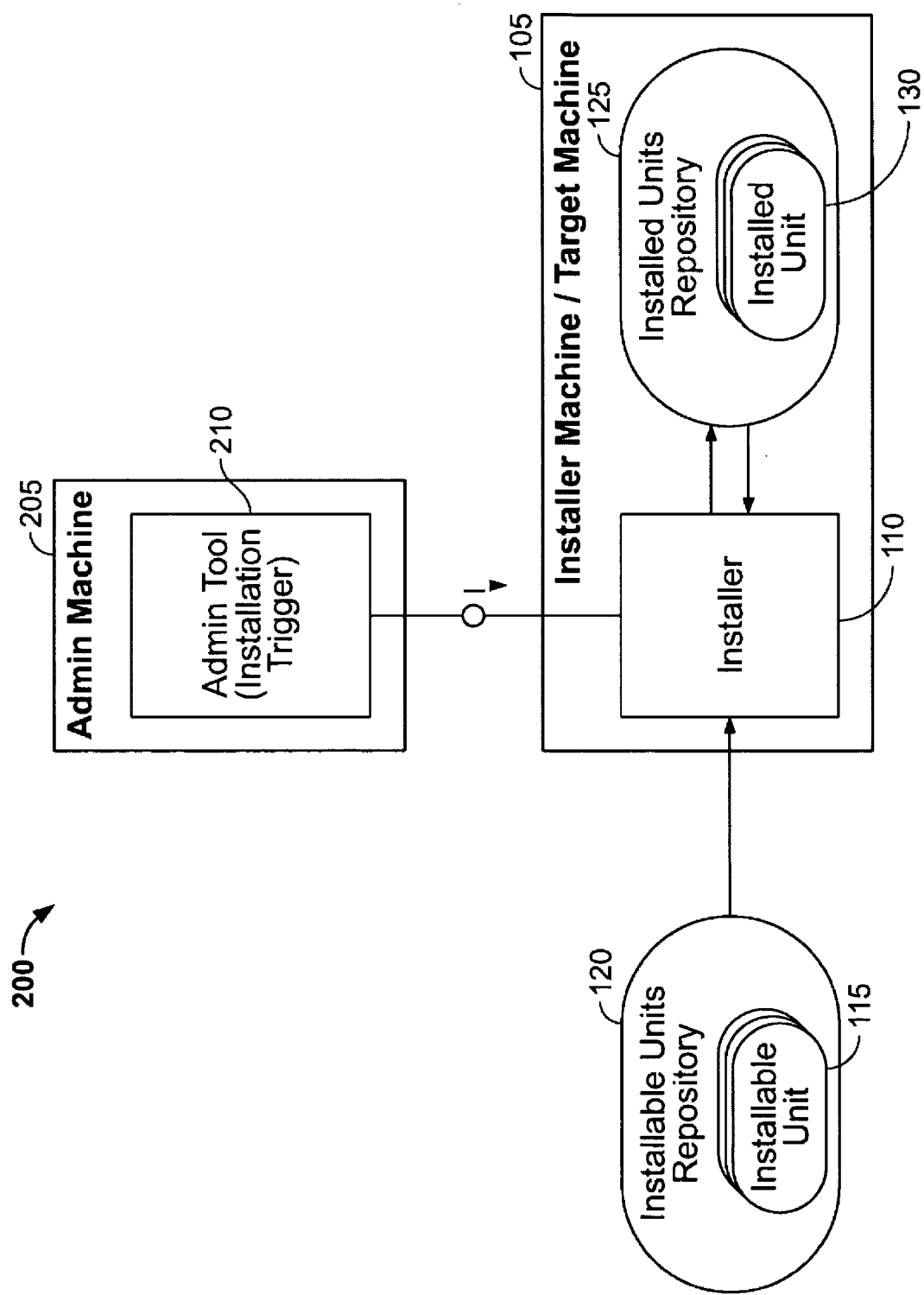
FIG. 2 is a conventional installation system in which an administrator initiates the installation.

FIG. 2 is a conventional installation system 200 in which an administrator initiates the installation. The system 200 includes a target device 105 that includes an installer 110 and an installed components repository 125 for storing installed components 130. An administration device 205 separate from the target device 105 includes an administration tool 210 that invokes an installation of an installable component 115 from an installable component repository 120 by sending a trigger message to the installer 110 on the target device 105. The installer 110, however, resides on the same device onto which the installable component 115 is installed. In a typical scenario, the administration device 205 is used to invoke installations, updates, and other maintenance on multiple devices distributed throughout an enterprise. The administrator tool 210 can be implemented by system management software that controls which enterprise devices have which installed components but that merely serves to trigger installers, such as installer 110, that reside on the enterprise devices.

Figure 3:
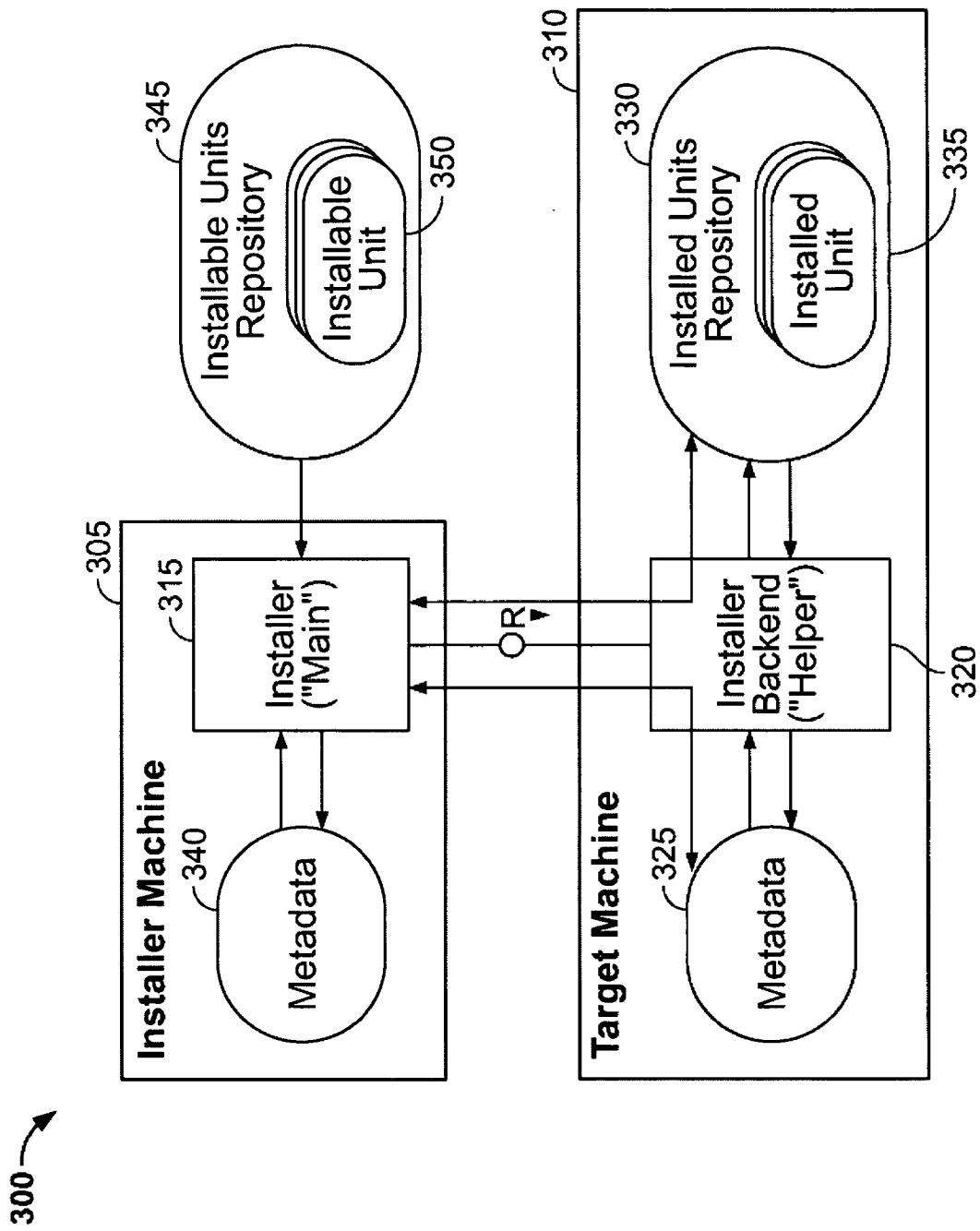
FIG. 3 is an exemplary installation system in accordance with the invention.

As shown in FIG. 3, an exemplary installation system 300 in accordance with the invention includes an installer device 305 and a target device 310. The installer device 305 includes an installer 315 having one or more installer components. The installer 315 is located remotely from the target device 310 and is used to install one or more installable components on the target device 310. For example, the installer device 305 and the installer 315 can be maintained by a producer or distributor of a software system or component. The target device 310 can be maintained by a customer at a remote location. When the customer desires to install the software system or a component thereof, or when the producer releases a software update, the desired installation can be installed onto the target device 310 at the customer location by the remotely located installer 315.

In some implementations, the installer 315 includes a primary or main part and an installer backend 320, which is a secondary or helper part. The main installer 315 includes the active and intelligent components that control the installation. The installer backend 320 is rather passive and small in relation to the main installer 315. Accordingly, the main installer 315 and the installer backend 320 operate in a master-slave relationship. The installer backend 320 operates as an interface to the target device 310 and provides simple services under the direction of the main installer 315, such as file system operations, file input/output, information about directories, registry updates and other registry operations, responding to questions about the operating system on the target device 310, and the like. The main installer 315 has read and write access, through the installer backend 320, to metadata 325 and an installed components repository 330 on the target device 310.

The target device 310 stores the target device metadata 325, which includes information about attributes (e.g., the operating system, the central processing unit (CPU), storage devices or capabilities, bandwidth, and the like) of the target device 310 itself, the environment of the target device, software components, properties and capabilities, customer preferences, installed components 335, and the installed components repository 330. The installer device 305 stores a greater proportion of metadata that is used during the installation. Metadata 340 stored by the installer device 305 includes information about attributes of the installer device 305 itself, a network used by the installer device 305, other devices in the network, an installable components repository 345, installable components 350, bandwidth requirements for performing installations, and the like. Accordingly, the target device metadata 325 serves to supplement the installer device metadata 340.

When an installation is to be performed, the installer 315 retrieves information from the target device metadata 325 and the installed components repository 330 for use in performing the installation. For example, the retrieved information can be used to identify which installable components 350 are installed and how the installation process is conducted. Using the retrieved information and appropriate elements of the installer device metadata 340, the installer 315 conducts an installation, through the installer backend 320, of selected installable components 350 from the installable components repository 345. The installable components repository 345 can be located on a separate device from the installer 315 and the installer backend 320 (i.e., on a third device), locally with respect to the installer device 305, or locally with respect to the target device 310. During the installation, the installer backend 320 operates under the control of the main installer 315. The main installer 315 monitors the progress of the installation by receiving update messages from the installer backend 320. The main installer 315 updates information and/or stores new information in the target device metadata 325 through the installer backend 325 in accordance with the installation.

Figure 4:
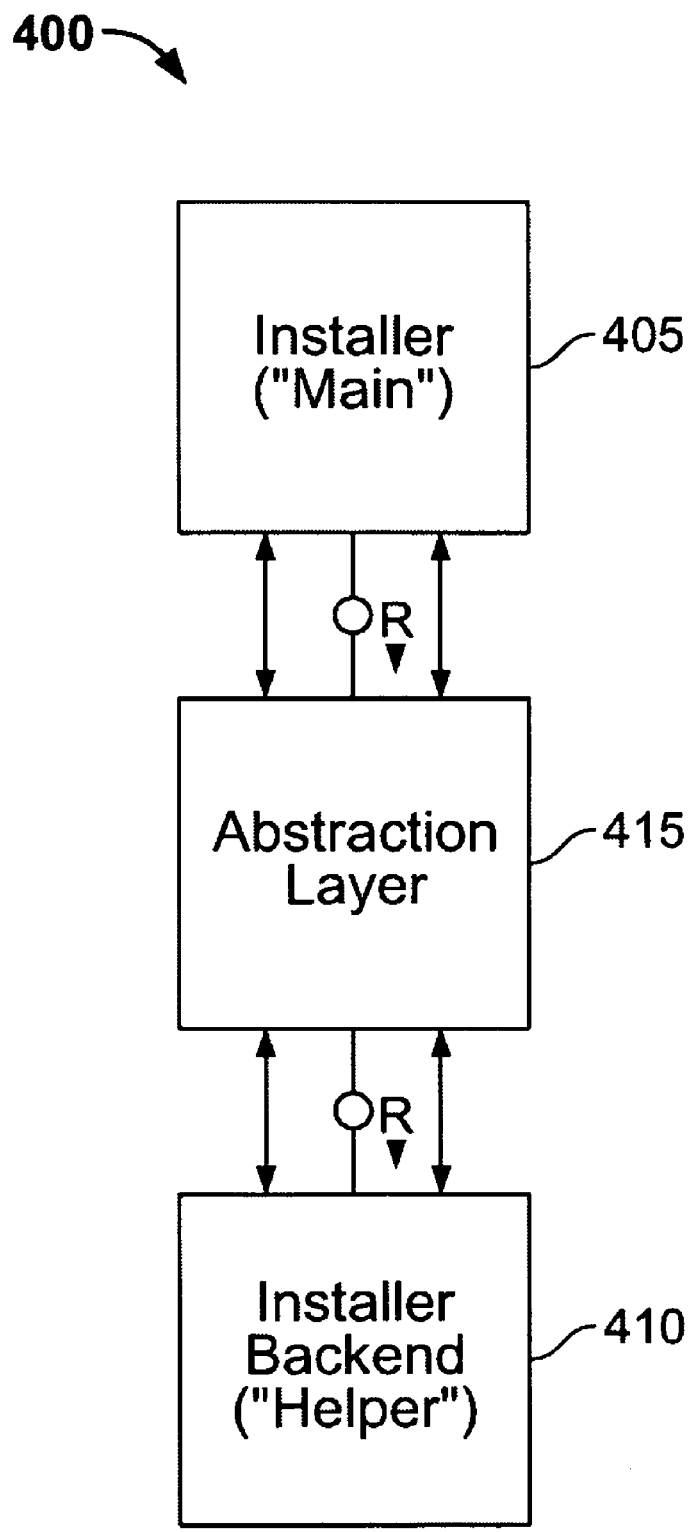
FIG. 4 is a main installer separated from an installer backend by an abstraction layer.

As shown in FIG. 4, a main installer 405 can be separated from the installer backend 410 by an abstraction layer 415. The use of an abstraction layer 415 allows the main installer 405 to perform generic operations independent of the programming language type, operating system type, and/or device type of the target device on which the installer backend 410 resides. Thus, the programming language, operating system, and device type can differ between the main installer 405 and the installer backend 410, and the same main installer 405 can be used to perform installations on different types of target devices that use different installer backends 410. For example, the installer backend 410 can be specific to the operating system (e.g., different installer backends 410 are used for Linux and Microsoft operating systems). The main installer 405 provides the same instructions regardless of the specific installer backend 410. An update registry command by the main installer 405, for example, may be converted through the abstraction layer 415 to cause a Microsoft system to update the registry and to cause a Linux system to update a property file. The abstraction layer 415 can reside in the installer device, as a separate software module from the main installer 405, or in the target device.

In registering an installation, for example, the main installer 405 does not know the machine type for the target device. The main installer 405 registers with the abstraction layer 415 using the same application program interface (API) regardless of the type of installer backend 410. The abstraction layer 415, in turn, is aware of the machine type and registers with the installer backend 410 based on the machine type. Accordingly, metadata communicated and retrieved through the installer backend 410 and installable components installed through the installer backend 410 are converted by the abstraction layer 415. In some implementations, however, the main installer 405 registers according to the machine type, and thus there is no abstraction layer 415.

Figure 5:
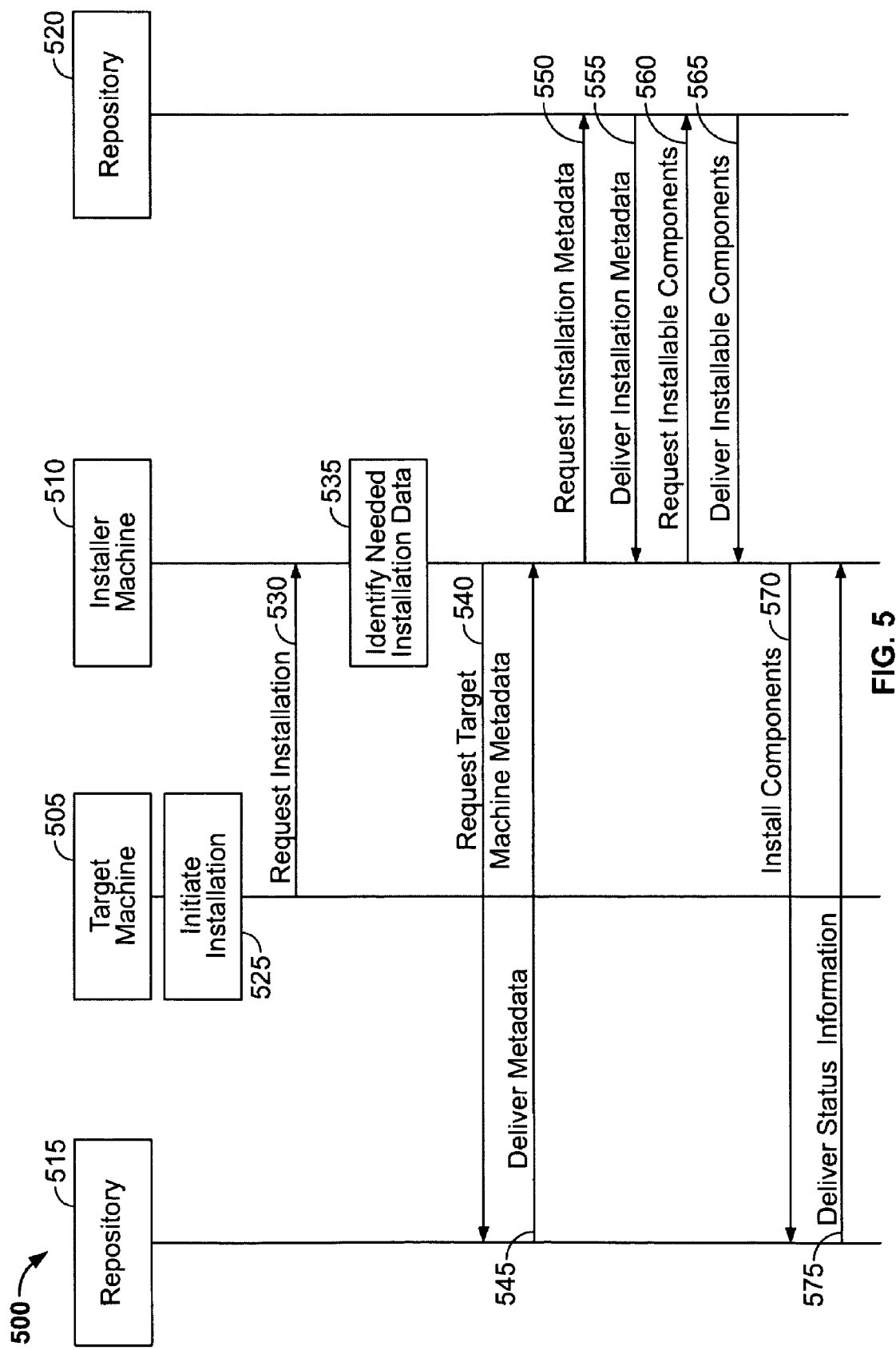
FIG. 5 is a signaling and flow diagram of a process for installing resources in a computer system.

FIG. 5 is a signaling and flow diagram of a process 500 for installing resources in a computer system. In this example, an installation is initiated (525) at a target device 505. A user at the target device 505 can initiate the installation or software on the target device 505 can initiate the installation in accordance with predetermined triggering criteria. In other implementations, the installation can be initiated from a separate administration device or from an installer device 510 (e.g., in accordance with a predefined update schedule). An installation request message 530 is sent to the installer device 510, which identifies installation data needed to perform the installation (535). The installer device 510 requests (540) and receives (545) target device metadata from a repository 515 associated with the target device 505. The request 540 may be sent by a main set of installer components on the installer device 510 to a subordinate, or backend, installer component or components located on the target device 505. The subordinate installer components are controlled by the main installer components to retrieve the requested metadata. In addition to the target device metadata, the request message 540 can also include a request for information about previously installed components that reside on the target device. Installed components and target device metadata can be stored in the same target device repository 515 or in separate storage locations.

The installer device 510 further requests (550) and receives (555) primary metadata from a repository 520 associated with the installer device 505. In one possible implementation, the primary metadata defines attributes of particular target device environments and attributes of the installation process for each different target device environment (e.g., which installable components are needed in a Windows environment). The installer device 510 retrieves the target device metadata to identify the target device environment and thus to determine which sets of primary metadata should be used in performing the installation. In cases where there is an abstraction layer 415 (see FIG. 4), the abstraction layer 415 can perform functions that are specific to a device type.

The installer device 510 requests (560) and receives (565) particular installable components from the installer device repository 520 (or from some other location). The installer device 510 installs (570) the installable components on the target device 505 by, for example, with sending commands for executing the installation and storing the installable components in the target device repository 515, at which time the installable components become installed components. During the installation 570, status information about progress of the installation is sent from the target device 505 and/or the target device repository 515 to the installer device 510 to allow the installer device 510 to monitor the installation, to perform actions in an appropriate sequence, and to address any problems with the installation. The status messages can include data relating to attributes of the target device 505 or status information relating to a progress of the installation.

Among other things, one or more installer devices 510 can be used to install components on one or more target devices 505. The described techniques can be used to remotely install patches from an administration device that includes a remote installer. Security functions, such as authentication, digital signatures, authorization, access controls, and the like, can be built-in to the main installer and the installer backend to authenticate devices, ensure that the remote device is authorized to perform particular functions, limit access to only certain data or functions, and otherwise ensure a secure and trusted installation process. Accordingly, the security functions can include authenticating the target device 505, authenticating the installer device 510, verifying an authorization to perform the installation, and controlling access between the target device 505 and the installer device 510.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described herein, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 6:
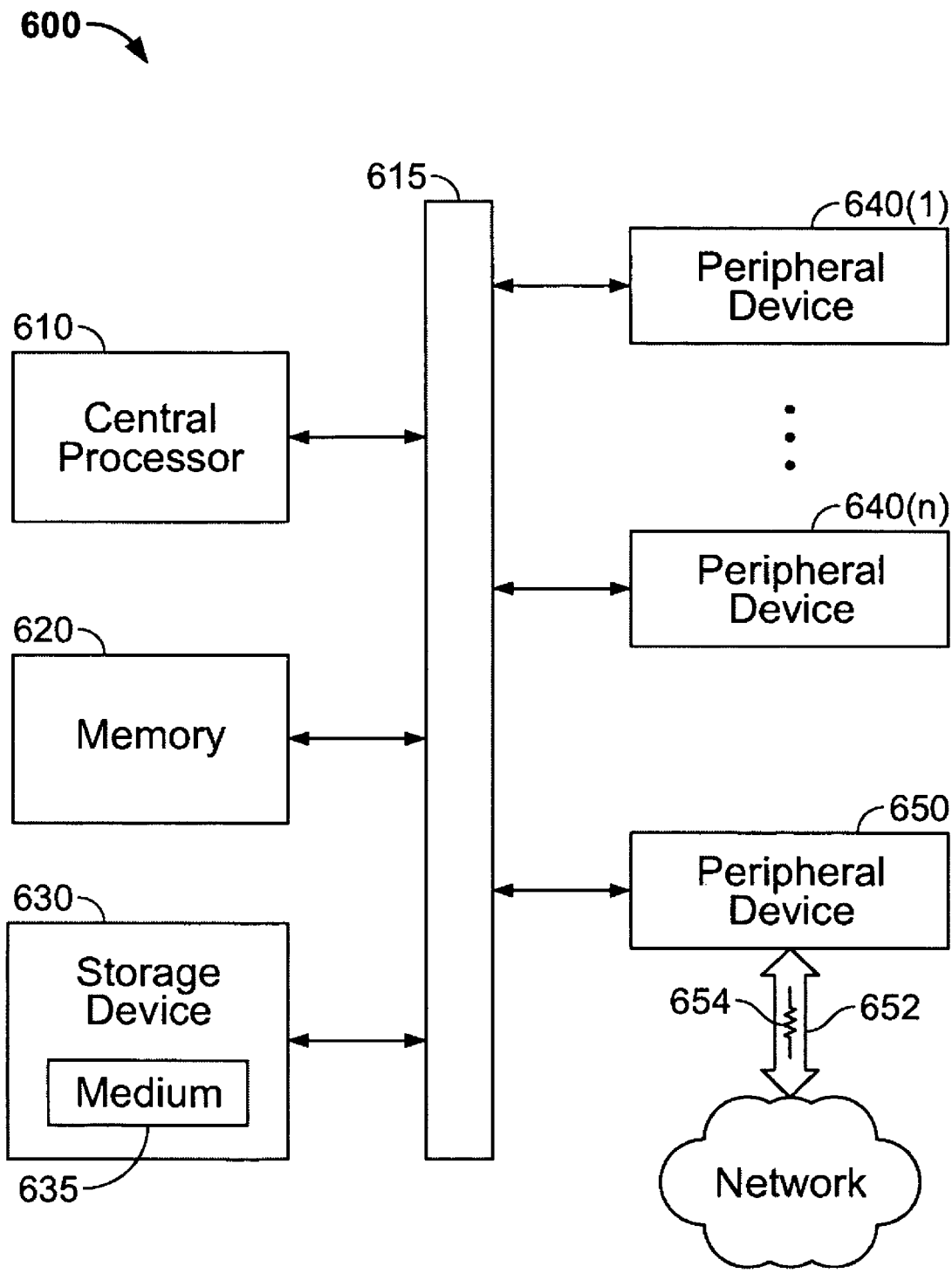
FIG. 6 is a block diagram illustrating an example data processing system in which a system for performing device authentication can be implemented.

FIG. 6 is a block diagram illustrating an example data processing system 600 in which a system for performing device authentication can be implemented. The data processing system 600 includes a central processor 610, which executes programs, performs data manipulations, and controls tasks in the system 600. The central processor 610 is coupled with a bus 615 that can include multiple busses, which may be parallel and/or serial busses.

The data processing system 600 includes a memory 620, which can be volatile and/or non-volatile memory, and is coupled with the communications bus 615. The system 600 can also include one or more cache memories. The data processing system 600 can include a storage device 630 for accessing a storage medium 635, which may be removable, read-only, or read/write media and may be magnetic-based, optical-based, semiconductor-based media, or a combination of these. The data processing system 600 can also include one or more peripheral devices 640(1)-640(n) (collectively, devices 640), and one or more controllers and/or adapters for providing interface functions.

The system 600 can further include a communication interface 650, which allows software and data to be transferred, in the form of signals 654 over a channel 652, between the system 600 and external devices, networks, or information sources. The signals 654 can embody instructions for causing the system 600 to perform operations. The system 600 represents a programmable machine, and can include various devices such as embedded controllers, Programmable Logic Devices (PLDs), Application Specific Integrated Circuits (ASICs), and the like. Machine instructions (also known as programs, software, software applications or code) can be stored in the machine 600 and/or delivered to the machine 600 over a communication interface. These instructions, when executed, enable the machine 600 to perform the features and function described above. These instructions represent controllers of the machine 600 and can be implemented in a high-level procedural and/or object-oriented programming language, and/or in assembly/machine language. Such languages can be compiled and/or interpreted languages.

As used herein, the term "machine-readable medium" refers to any computer program product, apparatus, and/or device used to provide machine instructions and/or data to the machine 600. Examples of a machine-readable medium include the storage medium 635, the memory 620, and/or PLDs, FPGAs, ASICs, and the like.

The invention has been described in terms of particular embodiments, but other embodiments can be implemented and are within the scope of the following claims. For example, the operations of the invention can be performed in a different order and still achieve desirable results. As one example, the process depicted in FIG. 5 does not require the particular order shown, or sequential order, to achieve desirable results (e.g., the operations 535-570 can be performed at many different places within the overall process). In certain implementations, multitasking and parallel processing may be preferable. Other embodiments are within the scope of the following claims.

What is claimed is:

1. A method for installing resources in a target device, the method comprising:

receiving an installation request message at an installation device, the installation request message corresponding to an installation to be performed on the target device and identifying installation data for performing the installation;

receiving, at the installation device, target device metadata from a metadata repository associated with the target device, the target device metadata including data regarding an operating system of the target device and being transmitted to the installation device from a backend installer component on the target device, the installation device communicating with the backend installer component over a network, the backend installer component operating as an interface to the target device and providing read and write access to the target device;

identifying primary metadata based on the target device metadata;

requesting the primary metadata from a metadata repository associated with the installer device;

receiving the primary metadata from the metadata repository, the primary metadata corresponding to attributes of the operating system of the target device as provided in the target device metadata;

retrieving one or more installable components from an installable units repository using the installation device; and transmitting the one or more installable components to the target device for installation of the one or more installable components on the target device under control of the installation device.

2. The method of claim 1, wherein the installation request message is generated by the target device.

3. The method of claim 1, wherein the installation device controls the installation based on interactions between execution of instructions on the installation device and execution of instructions on the target device, the interactions including:
receiving an update message at the installation device, the update message being sent by the target device; and
storing information contained in the update message at the installation device, the information corresponding to at least one of attributes of the target device and progress of the installation.

4. The method of claim 1, wherein the installation comprises installing the one or more installable components in an installed units repository that is communicably coupled to the backend installer component at the target device.

5. The method of claim 1, wherein the primary metadata defines features selected from the group consisting of attributes of the one or more remote installer components, attributes of an environment of the one or more remote installer components, and attributes of the installable units repository.

6. The method of claim 1, further comprising executing a security function selected from the group consisting of authenticating the target device, authenticating a device associated with the one or more remote installer components, verifying an authorization to perform the installation, and controlling access between the target device and the one or more remote installer components.

7. The method of claim 1, wherein communications between the installation device and the target device pass through an abstraction layer, the backend installer component being specific to the operating system of the target device, the installation device being specific to another operating system different than the operating system of the target device, and the abstraction layer converting commands issued by the installation device to the backend installer component.

8. The method of claim 7, wherein the installation device registers with the abstraction layer, and the installer backend component registers with the abstraction layer based on type.

9. A computer program product, tangibly embodied in a machine-readable storage device, for installing resources in a target device, the computer program product being operable to cause data processing apparatus perform operations comprising:
receiving an installation request message at an installation device, the installation request message corresponding to an installation to be performed on the target device and identifying installation data for performing the installation;
receiving, at the installation device, target device metadata from a metadata repository associated with the target device, the target device metadata including data regarding an operating system of the target device and being transmitted to the installation device from a backend installer component on the target device, the installation device communicating with the backend installer component over a network, the backend installer component operating as an interface to the target device and providing read and write access to the target device;
identifying primary metadata based on the target device metadata;
requesting the primary metadata from a metadata repository associated with the installer device;
receiving the primary metadata from the metadata repository, the primary metadata corresponding to attributes of the operating system of the target device as provided in the target device metadata;
retrieving one or more installable components from an installable units repository using the installation device; and
transmitting the one or more installable components to the target device for installation of the one or more installable components on the target device under control of the installation device.

10. The computer program product of claim 9, wherein the installation request message is generated by the target device.

11. The computer program product of claim 9, wherein the installation device controls the installation based on interactions between execution of instructions on the installation device and execution of instructions on the target device, the interactions including:
receiving an update message at the installation device, the update message being sent by the target device; and
storing information contained in the update message at the installation device, the information corresponding to at least one of attributes of the target device and progress of the installation.

12. The computer program product of claim 9, wherein the installation comprises installing the one or more installable components in an installed units repository that is communicably coupled to the backend installer component at the target device.

13. The computer program product of claim 9, wherein communications between the installation device and the target device pass through an abstraction layer, the backend installer component being specific to the operating system of the target device, the installation device being specific to another operating system different than the operating system of the target device, and the abstraction layer converting commands issued by the installation device to the backend installer component.

14. The computer program product of claim 13, wherein the installation device registers with the abstraction layer, and the installer backend component registers with the abstraction layer based on type.

15. A system, comprising:
a target device that includes a backend installer component operating as an interface to the target device and providing read and write access to the target device; and
an installation device that communicates with the backend installer component over a network, the installation device:
receiving an installation request message corresponding to an installation to be performed on the target device and identifying installation data for performing the installation;
receiving target device metadata from a metadata repository associated with the target device, the target device metadata including data regarding an operating system of the target device and being transmitted to the installation device from the backend installer component;
identifying primary metadata based on the target device metadata;
requesting the primary metadata from a metadata repository associated with the installer device;
receiving the primary metadata from the metadata repository, the primary metadata corresponding to attributes of the operating system of the target device as provided in the target device metadata;
retrieving one or more installable components from an installable units repository using the installation device; and transmitting the one or more installable components to the target device for installation of the one or more installable components on the target device under control of the installation device.

16. The system of claim 15, wherein the installation request message is generated by the target device.

17. The system of claim 15, wherein the installation device controls the installation based on interactions between execution of instructions on the installation device and execution of instructions on the target device, the interactions including:
   receiving an update message at the installation device, the update message being sent by the target device; and
   storing information contained in the update message at the installation device, the information corresponding to at least one of attributes of the target device and progress of the installation.

18. The system of claim 15, wherein the installation comprises installing the one or more installable components in an installed units repository that is communicably coupled to the backend installer component at the target device.

19. The system of claim 15, wherein communications between the installation device and the target device pass through an abstraction layer, the backend installer component being specific to the operating system of the target device, the installer device being specific to another operating system different than the operating system of the target device, and the abstraction layer converting commands issued by the installation device to the backend installer component.

20. The system of claim 19, wherein the installation device registers with the abstraction layer, and the installer backend component registers with the abstraction layer based on type.

* * * * *